UNITED STATES PATENT OFFICE.

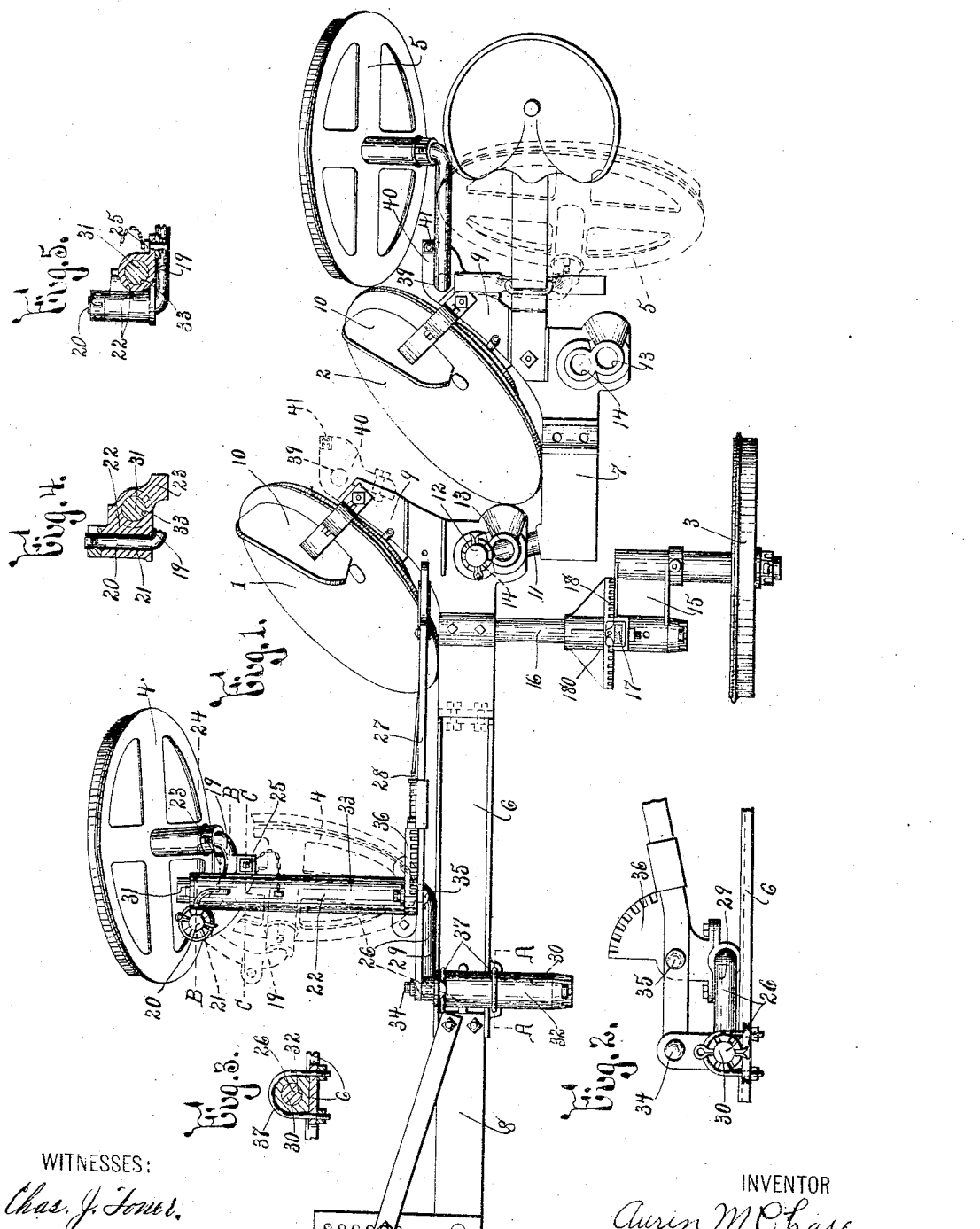

AURIN M. CHASE, OF SYRACUSE, NEW YORK, ASSIGNOR TO SYRACUSE CHILLED PLOW COMPANY, OF SYRACUSE, NEW YORK, A CORPORATION OF NEW YORK.

PLOW.

No. 884,365.  Specification of Letters Patent.  Patented April 14, 1908.

Application filed February 11, 1903. Serial No. 142,867.

*To all whom it may concern:*

Be it known that I, AURIN M. CHASE, of Syracuse, in the county of Onondaga and State of New York, have invented a certain new and useful Plow, of which the following is a specification.

My invention has for its object the production of a plow, which is particularly simple in construction and practical and efficient in operation; and to this end, it consists in the novel combinations and devices hereinafter fully set forth and pointed out in the claims.

In describing my invention, reference is had to the accompanying drawing, forming part of this specification in which like characters refer to corresponding parts in all the views.

Figure 1 is a plan view of a plow embodying this invention. Fig. 2 is a side elevation of a front portion of said plow. Figs. 3, 4 and 5 are vertical sectional views taken, respectively, on lines A A, B B and C C, Fig. 1.

The illustrated exemplification of my invention is what is known as a "gang-disk plow", but I do not limit this invention to either a disk plow or a gang plow. Said gang plow consists, essentially, of a frame, a plurality of earth turning members or elements as the disk plows proper, 1 2, a land-wheel 3, front and rear furrow-wheels 4 5, and means for raising and lowering the frame relatively to the land-wheel and the front furrow-wheel, and holding said frame in its adjusted position. The frame consists of a main member 6 and a detachable member 7; the member 6 being formed with a forward extension 8, to which the draft-animals are connected, and with a rear laterally-extending fixed arm 9. The disk or plow-proper 1 is journaled in the arm 9, and a scraper 10 for said disk or plow is suitably supported on the arm 9. Said detachable frame-member 7 is formed at its front end with a laterally-extending arm 11 having an upturned pivotal portion 12, which may be journaled at will in either one of two pivot-bearings 13 14, provided side by side at the rear end of the frame-member 6. The rear end of the detachable frame-member 7 is of substantially the same construction as the corresponding end of the frame-member 6, being provided at one side with pivot-bearings 13 14, and at the other side with a fixed arm 9, which is equipped with a bearing for the disk or plow-proper 2 and supports a corresponding scraper 10. It will be readily understood that additional frame-members 7 may be coupled in a chain, one in front of the other, to the illustrated member 7.

The land-wheel 3 is of any desirable form, size and construction, being here shown as journaled in the rear end of a movable arm 15, having its front end loosely mounted on a spindle or arm 16 projecting laterally from the rear end of the frame-member 6. The arm 15 is rocked on the spindle or arm 16 by any suitable means, as an upwardly extending lever 17, and is held in its adjusted position by a toothed segment 18 fixed to said spindle or arm 16, and a locking member 180 supported by said lever 17 and coöperating with the segment 18. As the arm 15 is rocked on the spindle 16, the frame is raised or lowered relatively to the rear end of the arm 15 and the land-wheel 3.

In the preferable construction of my plow, the furrow-wheel 4 is journaled on an arm 19, which is provided with an upwardly-extending substantially vertical pivot 20 journaled in a substantially upright pivot-bearing 21 of a support 22, and is movable into and out of engagement with a stop 23 provided on the support 22 at the rear of the pivot 20. Said support 22 is provided with a bearing 33 which is arranged at the rear of the pivot-bearing 21 and is connected to the frame of the plow by means presently described. When the furrow-wheel 4 is in its position assumed during the turning of the furrow, the lower portion, or tread, of its periphery is at the inner side of a vertical plane indicated by the line 24, extending through the substantially vertical pivot 20 of the arm 19 parallel to the line of draft, (or in other words, at the inner side of the pivot or axis for the furrow-wheel 4) and the front portion of said wheel 4 is generally extended in advance of the pivot 20. The furrow-wheel 4, arranged as shown and described, readily swings inwardly on its axis, as indicated in dotted lines, Fig. 1, for facilitating turning of the plow to the right, and when the plow is again drawn forwardly swings in a reverse direction or back to the position indicated by full lines in the drawing. The draft of the plow, when moving forwardly, tends to hold the arm 19 in engagement with the stop 23 and thus holds the plow-proper substantially parallel to the line of draft in the normal use of the plow and causes the plow to move in a line substantially parallel with the furrow previously turned. Said stop 23 thus limits the outward swinging of the furrow-wheel on the substantially vertical axis thereof. By arranging the pivot 20 of the arm 19 at the rear of the front portion of the furrow-wheel 4 and in advance of the bearing 33 of the support 22, the amount of space required for the swinging movement of the furrow-wheel 4 is reduced to a minimum, and it is possible to support said furrow-wheel so as to be capable of the desired movement on its substantially vertical axis at one side of the frame-member 6 and in front of the plow-proper 1, without lengthening the frame or requiring special construction thereof. It will be understood, however, that the arm 19 may be of sufficient length so that the front portion of the furrow-wheel 4 will be at the rear of the pivot 20.

It is sometimes desirable to lock the furrow-wheel 4 from movement on its substantially vertical axis, as when the plow is used on a side hill. This result may be accomplished by any suitable means, as a pin or locking member 25, removably arranged in apertures in ears or projections, on the arm 19 and the support 22, and connected to the support 22 by a chain in order that it may be present for use when needed.

As here illustrated, the means for raising and lowering the frame relatively to the front furrow-wheel 4 and holding the same in its adjusted position, consists of a shaft 26, a lever 27 and a locking member 28. The shaft 26 is formed with a crank-arm 29 and with front and rear pivotal portions 30 31, respectively, journaled in a bearing 32 provided on the frame-member 6, and in the bearing 33 of the support 22. The lever 27 is pivoted at one end at 34 to an arm rising from the frame-member 6, is pivoted at 35 to a notched or toothed arm 36 rising from the support 22, and is provided with a hand-engaging portion at its other end. Said shaft 26 and lever 27 form connecting members between the frame and the support 22, and move relatively to said frame and support when effecting vertical adjustment of the frame relatively to the furrow-wheel 4. It will be noted, that the distance between the pivots 34 35 is substantially the same as the distance between the pivotal portions 30 31 of the shaft 26, and that therefore, as the frame is raised or lowered relatively to the support 22 no material variation in the line of direction of the pivot-bearing 21 is effected, and consequently, variation in the operation of the front furrow-wheel 4 is avoided. The locking member 28 is supported by the lever 27 and is movable into and out of the notches in the arm 36. When said locking member is in operative position, the shaft 26 and the lever 27 are prevented from movement relatively to the support 22, and the frame of the plow is firmly held in its adjusted position relatively to the support 22.

The bearing 32 is usually movable laterally relatively to the frame-member 6 and is held in its adjusted position by any desirable means, as U-shaped bolts 37. The support 22 and the furrow-wheel 4 move laterally with the bearing 32, and, consequently, the desired lateral adjustment of the furrow-wheel 4 may be effected by varying the position of the bearing 32.

The rear furrow-wheel 5, is mounted on the rear end of an arm having a substantially upright pivot 38, detachably journaled in a pivot-bearing 39, provided in a part 40 which may be removably secured to the rear ends of the frame-members 6 7, and is provided with a stop 41 for limiting the turning of said furrow-wheel on the pivot 38 to its position assumed during the turning of the furrow. Said pivot 38 (or in other words the axis of the furrow-wheel 5) is obviously arranged at the rear of the front portion of the rear plow-proper, and said furrow-wheel is free to swing on the pivot 38 inwardly behind the rear plow-proper, as indicated by dotted lines.

The construction and operation of my plow will now be readily understood upon reference to the foregoing description and the accompanying drawing, and it will be apparent that more or less change may be made therein, without departing from the spirit of my invention.

Having thus fully described my invention, what I claim as new and desire to secure by Letters Patent, is:—

1. In a plow, a frame, an earth-turning element, a trailing non-tongue-controlled caster-wheel arranged in advance, and to the furrow-side of the earth-turning element, the advance portion thereof extending in front of the pivot of the caster-wheel, said caster-wheel being staggered so that its lower portion, in contact with the ground, is located at the inner side of a vertical plane passing through the pivot of the caster-wheel parallel to the line of draft, and a fixed stop on the frame for limiting the outward swinging movement of the caster-wheel, and thereby holding said wheel substantially parallel to the line of draft in the normal use of the plow.

2. In a plow, a frame, an earth-turning element, a trailing non-tongue-controlled caster-wheel arranged in advance, and to the furrow-side of the earth-turning element, the advance portion thereof extending in front of the pivot of the caster-wheel, said caster-wheel being staggered so that its lower portion in contact with the ground, is located at the inner side of a vertical plane passing through the pivot of the caster-wheel parallel to the line of draft, a fixed stop on the frame for limiting the outward swinging movement of the caster-wheel, and thereby holding said wheel substantially parallel to the line of draft, and means for raising and lowering the frame relatively to the caster-wheel without materially affecting the relative position of the frame and said pivot of the caster-wheel, substantially as and for the purpose specified.

3. In a plow, a frame, an earth-turning element, a trailing non-tongue-controlled caster-wheel arranged in advance, and to the furrow-side of the earth-turning element, said caster-wheel being staggered so that its lower portion, in contact with the ground, is located at the inner side of a vertical plane passing through the pivot of the caster-wheel parallel to the line of draft, said caster-wheel being free to swing inwardly about the axis of its pivot relatively to the frame as the plow is turned to the right, a fixed stop on the frame for limiting the outward swinging of the caster-wheel relatively to the frame, and a rear trailing caster-wheel arranged at the rear of the earth-turning element and movable independently of the first-mentioned caster-wheel, substantially as and for the purpose set forth.

4. In a plow, a frame having a bearing, an earth-turning element, a support having a substantially upright pivot-bearing, a stop at the rear of the pivot-bearing, and a second pivot-bearing at the rear of the first-mentioned pivot-bearing, a shaft formed with a crank-arm and with front and rear substantially horizontal pivotal portions journaled, respectively, in the bearing of the frame and in the second-mentioned pivot-bearing of the support, a lever pivotally connected at one end to the frame in advance of the support and pivotally connected to said support, a trailing non-tongue-controlled caster-wheel arranged in advance, and to the furrow side of the earth-turning element, said caster-wheel being staggered so that its lower portion, in contact with the ground, is located at the inner side of a vertical plane passing through the pivot of the caster-wheel parallel to the line of draft, an arm carrying the furrow-wheel at its rear end and having its front end provided with a substantially upright pivot journaled in the first-mentioned pivot-bearing of the support, said arm being movable about the axis of its pivot to permit the furrow-wheel to swing inwardly, and coacting with the fixed stop of the support to limit the outward swinging of said furrow-wheel, and a rear trailing caster-wheel arranged at the rear of the earth-turning element and movable independently of the first-mentioned caster-wheel, substantially as and for the purpose specified.

In testimony whereof, I have hereunto signed my name in the presence of two attesting witnesses, at Syracuse, in the county of Onondaga, in the State of New York, this 19th day of January, 1903.

AURIN M. CHASE.

Witnesses:
 D. LAVINE,
 S. DAVIS.